Sept. 6, 1932.   M. H. BALLARD   1,875,799
PRESS
Original Filed Jan. 6, 1927
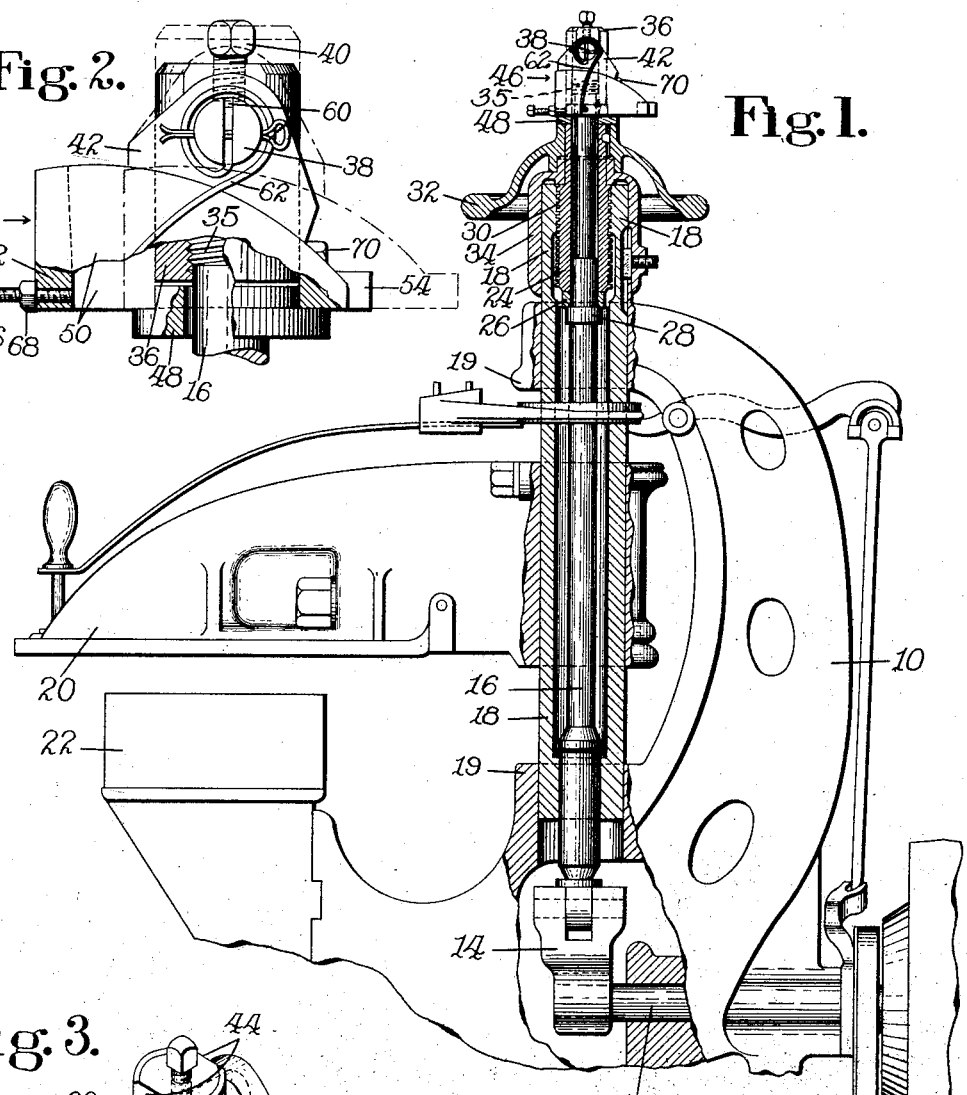
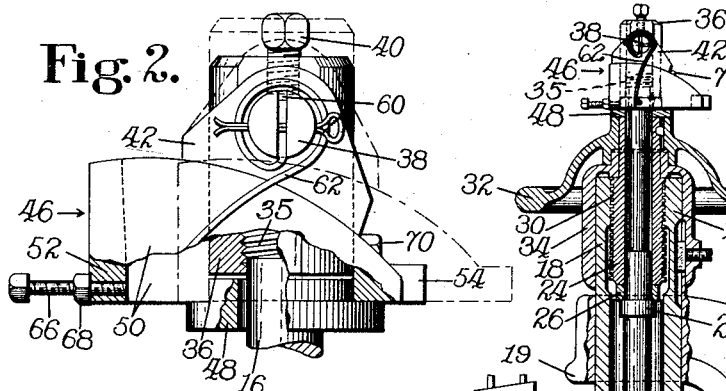
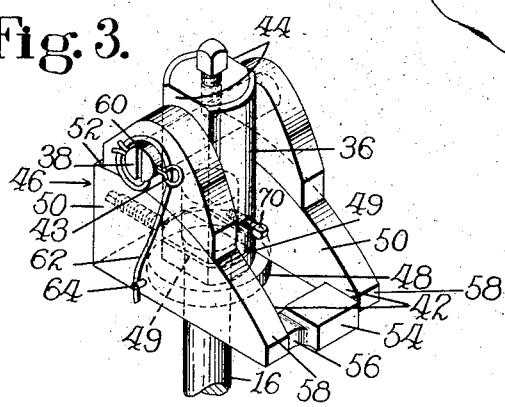
INVENTOR.
Milton H. Ballard
By his Attorney,
Harlow M. Davis Patented Sept. 6, 1932

1,875,799

UNITED STATES PATENT OFFICE

MILTON H. BALLARD, OF BEVERLY, MASSACHUSETTS, ASSIGNOR TO UNITED SHOE MACHINERY CORPORATION, OF PATERSON, NEW JERSEY, A CORPORATION OF NEW JERSEY

PRESS

Original application filed January 6, 1927, Serial No. 159,433. Divided and this application filed November 17, 1931. Serial No. 575,674.

This invention relates to improvements in presses and is a division of my application Serial No. 159,433, filed January 6, 1927. The invention is herein illustrated as embodied in a clicking machine of the type set forth in United States Letters Patent No. 921,503, granted May 11, 1909, on an application filed in the name of Arthur Bates.

In the use of presses of various types it frequently happens that, due to improper operation, a machine will become jammed in such manner that various of the operating parts are held under considerable pressure resulting from the action of sprung portions of the machine. Under such circumstances it is very often difficult to release the parts of the machine without breaking them or without disconnecting other parts of the machine. For example, difficulties of this kind sometimes occur in connection with the operation of clicking machines of the type disclosed in the aforementioned United States Letters Patent. Such machines commonly comprise a presser member arranged for movement toward and away from a work support in pressure applying operations, the presser member being mounted upon a post which in turn is secured by means of screw thread connections to a power operated spindle. It occasionally happens that in operating upon heavy material with such machines, the presser member becomes stalled upon the work support. When such a situation arises, the post, spindle, and frame of the machine are so sprung that great pressure is asserted upon the screw thread connections thus making it difficult to release the parts in order that they can be returned to their normal positions.

In view of the foregoing, one object of the invention is to provide a clicking machine of the type referred to in which the post will be secured to the spindle in such a way that the presser member can be moved with the spindle in the usual manner, but at the same time can be readily released when desired even if the machine is stalled in the manner above mentioned.

One feature of the invention consists in the provision of improved means for securing together the post and spindle of a machine of the type referred to and comprising a retaining member positioned between surfaces of the post and spindle, respectively, the member being so formed that a relatively slight movement of the member in a direction to effect release of pressure exerted upon the surfaces will result in the disconnection of the post and spindle. Preferably, the retaining member, which as illustrated is in the form of a wedge normally positioned between clamping surfaces of the spindle and post, comprises bearing surfaces one of which is so curved relatively to the other bearing surface that a slight movement of the wedge in the pressure releasing direction will, by increasing the effective angle of the wedge beyond that at which friction will hold the wedge in position, result in the forcing out of the wedge. In operation the wedge is preferably driven into a position in which the holding power of the wedge is slightly more than enough to hold the post and spindle together without slipping under the action of the spindle in moving the post. When it is desirable to release the spindle from the post, the wedge is driven a slight distance in the opposite direction. As the wedge moves outwardly the effective angle of the wedge immediately becomes steeper so that the friction between the engaging surfaces is insufficient to prevent slipping and the reaction of the sprung parts in the machine acts to force out the wedge. Thus the invention provides means for effectively securing together the presser member and spindle in operative relation but at the same time greatly facilitates the disconnection of the parts.

Although the invention has been discussed and will be described with especial reference to its adaptability for use in clicking machines of the above-mentioned type, it will be understood that in various respects the invention is not limited to embodiment in such machines.

Other features of the invention will be described in the detailed description and will be pointed out in the claims.

In the drawing,

Fig. 1 is a side elevation partly in section of a machine illustrating one embodiment of the invention;

Fig. 2 is a side elevation partly in section of the clamping device and wedge; and Fig. 3 is a perspective view of the clamping device and wedge.

The invention is illustrated as embodied in a clicking machine which comprises (see Fig. 1) a frame 10 supporting a shaft 12 for operating a crank 14 to produce a reciprocating movement of a shaft or spindle 16 in a vertical direction. Operatively connected to the upper end of the spindle 16 is a post 18 mounted in frame bearings 19 for vertical sliding movement with the spindle and for movement of rotation about its axis. The post 18 carries a presser member 20 reciprocable toward and from a free die positioned on sheet material supported by a cutting bed 22 to force the die through the sheet material to die-out parts or blanks such as parts of shoe uppers. To facilitate ready inspection of the leather or other material and to permit movement of the presser member into alignment with a die positioned anywhere on the material to be operated upon, the presser member 20 is movable laterally over the cutting bed. To this end, for supporting the post 18 rotatively on the spindle 16 the latter is provided with a sleeve 24 slidably mounted thereon and resting upon a bearing 26 supported by a collar on the spindle 16. The post 18 is connected to the sleeve by screw threads 30 and is movable up or down relatively to the spindle 16 as the sleeve 24 is rotated by means of a hand wheel 32 which is keyed to the sleeve 24 and rests upon a sleeve 34 which bears upon the upper end of the sleeve 24 and surrounds the upper portion of the post 18. The construction so far described is like the construction of corresponding parts described in United States Letters Patent No. 1,431,920, granted October 17, 1922, upon an application filed in my name, to which reference may be had for a more detailed description of parts not fully herein disclosed.

In order to clamp the sleeve 24 between the collar 28 and the end of the spindle 16 to secure the post 18 to the spindle for vertical movement therewith to force the presser toward and from a die on the material to be died-out, the spindle 16 is provided at its upper end with screw threads 35 upon which is mounted a nut 36 (best shown in Figs. 2 and 3) carrying a wrist pin 38, held against rotation by a set-screw 40, upon which is rotatably mounted a pair of shoes 42 extending on opposite sides of the spindle, the latter being cut away to form flat bearing surfaces 44 at the end of the spindle. The shoes 42 are retained upon the wrist pin 38 by cotter pins 43. The lower surfaces of the shoes 42 are curved to conform to curved surfaces of a retaining member comprising a wedge 46 which is positioned between the shoes 42 and a bushing 48 resting upon the upper end of the sleeve 24.

The wedge 46 comprises upstanding side plates 50 positioned adjacent to the surfaces 44 on opposite sides of the nut 36, a plate 52 connecting the side plates at one end thereof and an abutment 54 connected by lugs 56 to the plates 50 being provided at the other end. The lower surfaces of the plates 50 are flat and rest upon the bushing 48 which is cut away at 49 to provide bearing surfaces for the plates. The curved upper surfaces 58 of the plates 50 lie in the periphery of an imaginary cylinder positioned with its axis perpendicular to the plates. As shown in Figs. 2 and 3, the surfaces 58 incline downwardly from the end plate 52 toward the right, the inclination being much steeper as the abutment 54 is approached. It is to be noted that, since the bearing surfaces of the shoes 42 and the bearing surfaces 58 of the wedge are of the same curvature, consecutive portions of the shoes will successively engage consecutive portions of the surfaces 58 upon relative movement of the wedge and shoes, the pivotal mounting of the shoes permitting movement thereof as required in maintaining the curved surfaces of the wedge and shoes in engagement throughout the length of the bearing surfaces of the shoes. Thus any tendency of the shoes to gouge the surfaces 58 of the wedge is eliminated.

The wrist pin 38 is provided with a slot 60 in which is inserted one end of a stiff spring 62, the other end of which extends downwardly into contact with a pin 64 carried by one of the wedge plates 50. The arrangement is such that the spring 62 tends to move the wedge 46 inwardly between the shoes 42 and the bushing 48 (Fig. 3) until all parts of the lower surfaces of the shoes 42 bear upon the upper surfaces 58 of the wedge.

The wedge 46 is provided with a set-screw 66 extending through the end plate 52 and arranged for contact with the bushing 48. By adjustment of the set-screw 66 the inward movement of the wedge 46 between the shoes 42 and the bushing 48 under the action of spring 62 can be limited as desired in order to vary the operative position of the wedge with respect to the shoes 42. A lock nut 68 is provided for securing the set-screw 66 in adjusted position.

In order to take up the play between the shoes 42 and the wedge 46, with the spindle 16 in the position shown in Fig. 1, the nut 36 is adjusted upon the screw threads 35 in a direction to move the wrist pin 38 toward the wedge in its innermost or operative position for a given adjustment of the screw 66, until the shoes 42 can be rotated a slight amount only, some play being desirable in order that the spring 62 can return the wedge to its operative position after the wedge has been forced out. A set-screw 70 provides means for securing the nut 36 in adjusted position.

The arrangement of parts just described is such that the wedge 46 operates as a transmitting member for the pressure exerted upon pressure members comprising the bushing 48 and shoes 42 by the spindle 16 in moving the presser member 20. This pressure acts substantially in a perpendicular plane through the axis of the wrist pin 38.

The angularity of curved surfaces 58 relatively to the flat surface of the wedge increases from the abutment 54 to the end wall 52, as shown in Fig. 2, so that the angle of the wedge varies lengthwise thereof. Thus the wedge is equivalent to a plurality of flat wedges of different wedge angles, and, disregarding for the moment the action of the shoes 42, the wedge angle which is effective at any given time is determined by the angularity of the portions of the surfaces to which pressure is applied. For example, if pressure be applied to the bottom of the wedge and to the upper portions of surfaces 58 near the end wall 52, the effective angle, that is, the angle between the bottom of the wedge and a plane tangent to surfaces 58 at the line of intersection with the plane in which pressure is applied to the surfaces, will be comparatively small. However, if pressure is applied to surfaces 58 near the abutment 54, the effective angle will be comparatively large. In the illustrated machine downward pressure is applied to the wedge substantially in a fixed vertical plane, through action of spindle 16, with the result that the effective angle of the wedge will be determined by the position of the wedge relatively to that plane and also upon the angularity of the shoes 42 which are so movable on wrist pin 38 that the central portions of the bearing surfaces of the shoes will be located slightly to the left or right of that plane, depending upon the portion of the wedge surfaces engaging the shoes. Since the bearing surfaces of the shoes 42 are curved to correspond to the curvature of the wedge, consecutive portions thereof will engage different consecutive portions of the surfaces 58 extending at various angles to the flat bottom of the wedge. However, the resultant of the pressure applied to surfaces 58 will act upon the wedge surface within the limits of the bearing surfaces of the shoes, and, consequently, more specifically stated, the effective angle of the wedge will be the angle included between the flat bottom surface of the wedge and a plane tangent to the surfaces 58 at points somewhere along the curve of the engaging portions of the wedge and shoes. Thus, when the angles between the flat surface of the wedge and those portions of the surfaces 58 engaged by the shoes are small, the effective angle of the wedge will be small and vice versa. This should be clear from an inspection of Fig. 2 in which the wedge in its innermost position with the shoes resting upon flat portions of the curve is indicated by dotted lines, and in which the wedge in a position in which the shoes rest upon steeper portions of the curve is shown in full lines.

The effect of friction between the wedge and the bushing 48 is substantially constant for given forces acting upon the wedge, but the friction between the curved surfaces 58 of the wedge and the shoes 42 resulting from the action of the components of the forces upon the shoes which act normal to the surfaces 58 will depend upon the effective angle of the wedge as determined by the angularity of the portions of the wedge surfaces engaged. The forces acting normally to the curved surfaces and tending to hold the wedge and shoes together vary approximately as the cosine of the effective wedge angle. Thus the normal force, and consequently the friction, is increased as the effective angle decreases.

For relatively small angles the friction between the surfaces is sufficient to hold the wedge in position to clamp the sleeve 24 to the spindle, but for relatively large angles a small horizontal component of forces acting upon the wedge is sufficient to overcome the friction and to force out the wedge.

In adjusting the parts of the machine for operation the wedge 46 is preferably so positioned relatively to the shoes 42 that its effective angle is such that the friction between the wedge and its bearing surfaces is slightly more than sufficient to prevent the forcing out of the wedge under the action of the downward movement of the spindle.

In the normal operation of the machine the pressure-transmitting member on wedge 46 serves as a retaining member positioned between the clamping surfaces of the shoes 42 and the bushing 48 to secure the sleeve 24 against movement longitudinally of the spindle 16 thus to insure movement of the post 18 and presser member 20 with the spindle 16 in pressure-applying operations upon material supported on the bed 22.

In operating upon heavy or thick material, especially when a die is positioned upon the work near the extremity of the presser member, it sometimes happens that the presser member does not complete its operation and the machine is stalled with the crank 14 on lower dead-center. As a result of this the post, spindle and frame of the machine are sprung in such manner as to maintain great pressure upon the wedge 46 and the parts associated with it. In order to release the wedge so that the various parts can be returned to their normal positions, the wedge is forced out by striking against the abutment 54. It is necessary to move the wedge a small distance only for the reason that as it commences to move out the effective angle of the wedge almost immediately becomes steeper than the critical angle at which the wedge will be held in position by friction, and the wedge is automatically forced out by the pressure stored up in the sprung parts, said parts returning at once to their normal positions. The shaft 12 can then be rotated to raise the spindle 16. As the spindle rises, the collar 28 will contact with the sleeve 24 and raise the post and presser member with the spindle until the parts assume the positions shown in Fig. 1. As the spindle 16 rises, the spring 62 forces the wedge 46 inwardly until it is again in its normal operative position. It is to be noted that no adjustment of the parts is necessary after the release of the wedge.

Having described my invention, what I claim as new and desire to secure by Letters Patent of the United States is:

1. In a press, a bed for supporting work to be operated upon, a post having a presser member mounted thereon in spaced relation to the bed, a spindle for operating the post, a member located on the spindle and arranged adjustably to engage the upper end of the post, clamping means carried near the upper end of the spindle, and a wedge insertable between the clamping means and said member for releasably securing the post to the spindle.

2. In a machine for performing pressure-applying operations, a work-supporting bed, a post having a presser member mounted thereon in spaced relation to the bed, a spindle for operating the post, a member mounted on the spindle for supporting the post, a clamping member carried by the upper end of the spindle, and a wedge positioned between the post-supporting member and the clamping member releasably to secure the post to the spindle, the bearing surfaces of the wedge being so formed that the effective angle of the wedge is variable according to the distance which the wedge is inserted between the clamping member and the post-supporting member.

3. In a machine for performing pressure-applying operations, a work-supporting bed, a post having a presser member mounted thereon in spaced relation to the bed, a spindle for operating the post, a sleeve mounted on the spindle for supporting the post, a clamping member carried by the spindle, and a wedge adapted for insertion between the clamping member and sleeve for securing the post to the spindle, the wedge being so shaped that a relatively small movement of the wedge in a direction to release pressure exerted by the clamping member will result in the release of the wedge.

4. In a machine for performing pressure-applying operations, a work-supporting bed, a post having a presser member mounted thereon in spaced relation to the bed, a spindle for operating the post, a sleeve mounted on the spindle for supporting the post, a clamping member carried by the spindle, a wedge adapted for insertion between the clamping member and sleeve for securing the post to the spindle, the wedge being so shaped that a relatively small movement of the wedge in a direction to release pressure exerted by the clamping member will result in the release of the wedge, and means for forcing the wedge inwardly between the clamping member and sleeve.

5. In a machine for performing pressure-applying operations, a work-supporting bed, a post having a presser member mounted thereon in spaced relation to the bed, a spindle for operating the post, a member mounted on the spindle for supporting the post, a clamping member carried by the spindle, and a wedge positioned between the post-supporting member and the clamping member, the wedge having a curved bearing surface for engaging a correspondingly curved surface of the clamping member releasably to secure the post to the spindle, the construction and arrangement being such that the effective angle of the wedge is variable so that a slight movement of the wedge in a direction to release the pressure upon the wedge will result in the forcing out of the wedge.

6. In a machine for performing pressure-applying operations, a work-supporting bed, a post having a presser member mounted thereon in spaced relation to the bed, a spindle for operating the post, a sleeve mounted on the spindle for supporting the post, a clamping member carried by the spindle, and a wedge adapted for insertion between the clamping member and the sleeve for securig the post to the spindle, the wedge having a curved bearing surface for engagement with a correspondingly curved surface of the clamping member so arranged that the effective angle of the wedge is variable and is dependent upon the position of the wedge relatively to the axis of the spindle.

7. In a machine for performing pressure-applying operations, a post, a spindle mounted within the post, and means for reciprocating the spindle, the spindle having a collar near one of its ends, a shoe spaced from the collar, a sleeve operatively connected to the post and mounted upon the spindle between the collar and the shoe, and a wedge extending between the sleeve and shoe for clamping the sleeve to the spindle.

8. In a press, a spindle, a sleeve slidably mounted on the spindle, a collar on the spindle for limiting movement of the sleeve along the spindle in one direction, a bushing for limiting the movement of the sleeve in the other direction, means for forcing the bushing toward the collar comprising a member pivoted to the spindle, and a wedge insertable between said member and the bushing.

9. A clicking machine comprising a frame, a work-supporting bed, a post slidably mounted in the frame, a presser member secured to the post and arranged for movement laterally over the bed and movable toward and away from the bed, means for reciprocating the post comprising a spindle, a sleeve operatively connected to the post and mounted upon the spindle, a nut upon one end of the spindle, a shoe pivotally mounted upon the nut, and a wedge insertable between the shoe and sleeve for securing the sleeve to the spindle.

10. In a clicking machine, a frame, a hollow post mounted for sliding movement in the frame, a spindle positioned within the post, means for reciprocating the spindle, a collar on the spindle, a sleeve slidably mounted upon the spindle and normally supported by the collar, the sleeve having a screw thread connection with the post, a shoe carried by the spindle, and a curved wedge positioned between the shoe and sleeve for preventing sliding movement of the sleeve relatively to the spindle.

In testimony whereof I have signed my name to this specification.

MILTON H. BALLARD.